US011975379B2

(12) United States Patent
Takahashi et al.

(10) Patent No.: US 11,975,379 B2
(45) Date of Patent: May 7, 2024

(54) HOT PRESS FORMING DIE

(71) Applicant: G-TEKT CORPORATION, Saitama (JP)

(72) Inventors: Naoki Takahashi, Tokyo (JP); Hiroki Itoi, Tokyo (JP); Makoto Tanaka, Gunma (JP); Hirokazu Maita, Tokyo (JP)

(73) Assignee: G-TEKT CORPORATION, Saitama (JP)

( * ) Notice: Subject to any disclaimer, the term of this patent is extended or adjusted under 35 U.S.C. 154(b) by 0 days.

(21) Appl. No.: 18/250,925

(22) PCT Filed: Dec. 14, 2022

(86) PCT No.: PCT/JP2022/046013
§ 371 (c)(1),
(2) Date: Apr. 27, 2023

(87) PCT Pub. No.: WO2023/120313
PCT Pub. Date: Jun. 29, 2023

(65) Prior Publication Data
US 2023/0321712 A1    Oct. 12, 2023

(30) Foreign Application Priority Data

Dec. 20, 2021  (JP) ................. 2021-205776

(51) Int. Cl.
*B21D 37/16*    (2006.01)
*B21D 22/02*    (2006.01)

(52) U.S. Cl.
CPC ............. *B21D 37/16* (2013.01); *B21D 22/02* (2013.01)

(58) Field of Classification Search
CPC ...... B21D 37/16; B21D 22/02; B21D 22/022; B21D 22/208; C21D 1/673

(Continued)

(56) References Cited

U.S. PATENT DOCUMENTS

2014/0130564 A1*  5/2014  Suzuki ................. B21D 22/208
                                                       72/342.5
2018/0272406 A1*  9/2018  Saini ..................... B21D 37/16

FOREIGN PATENT DOCUMENTS

JP        3863874 B      10/2006
WO    2013005318 A1      1/2013

OTHER PUBLICATIONS

"Decision to Grant," JP Application No. 2021-205776 dated Sep. 30, 2022 (3 pages).

(Continued)

*Primary Examiner* — Adam J Eiseman
*Assistant Examiner* — Fred C Hammers
(74) *Attorney, Agent, or Firm* — WOMBLE BOND DICKINSON (US) LLP (57) ABSTRACT

A hot press forming die includes a die main body (2) made of alloy tool steel, and a number of forming projections (3) projecting on the die main body and configured to form a forming surface (5) that comes into contact with a heated metal plate material that is an object to be formed and form a refrigerant passage through which a cooling medium flows. The die main body includes a first forming portion (14) in which the forming surface is formed to extend in a direction intersecting a forming direction of the metal plate material, a second forming portion (15) in which the forming surface is formed to extend in the forming direction, and a third forming portion (16) configured to connect the first forming portion and the second forming portion such that the forming surface becomes a convex surface. The forming projection provided on the third forming portion is formed to be a projecting strip extending between the first forming portion and the second forming portion.

(Continued)

It is possible to provide a hot press forming die for which forming convex portions with a high hardness can easily be formed.

4 Claims, 8 Drawing Sheets

(58) Field of Classification Search
USPC .......................................................... 72/342.2
See application file for complete search history.

(56) References Cited

OTHER PUBLICATIONS

"Notice of Reasons for Refusal," JP Application No. 2021-205776 dated Jul. 12, 2022 (6 pages).

* cited by examiner

HOT PRESS FORMING DIE

TECHNICAL FIELD

The present invention relates to a hot press forming die including forming convex portions that form a forming surface.

BACKGROUND ART

As a technique for forming body frame components of a vehicle, a hot stamping method that is one of hot press forming methods is known. The hot stamping method is a method of loading a metal plate material heated to a high temperature into a hot press forming apparatus, performing press forming for the metal plate material and quenching at the same time. A conventional hot press forming apparatus used to perform the hot stamping method of this type is described in, for example, patent literature 1.

The hot press forming apparatus disclosed in patent literature 1 includes a cooling device configured to quickly cool the metal plate material by applying a cooling medium to the metal plate material at the time of forming. The cooling device employs a configuration for ejecting the cooling medium from ejection holes open in a die main body toward the metal plate material and discharging the cooling medium through a passage formed between the die and the metal plate material. To make the cooling medium flow between the die and the metal plate material, the forming surface of the die is formed by a number of forming projections, and a space generated between the forming projections is used as the passage of the cooling medium. The forming projections described in patent literature 1 are formed by electrochemical machining, chemical etching, electric discharge machining, or a plating method.

The forming projections wear in accordance with the forming count. If the wear amount of the forming projections increases, the cooling medium is hard to flow. Hence, the worn forming projections are repaired by performing build-up welding and finishing using machining. The build-up welding is performed for each forming projection manually by a worker. When performing build-up welding for the forming projections, the die is heated to a predetermined preheat temperature.

RELATED ART LITERATURE

Patent Literature

Patent Literature 1: Japanese Patent No. 3863874

DISCLOSURE OF INVENTION

Problem to be Solved by the Invention

In the hot press forming die described in patent literature 1, it is not easy to form convex portions having a sufficient hardness and height such that the wear resistance becomes high. The forming projections shown in patent literature 1 are formed by electrochemical machining, chemical etching, electric discharge machining, or a plating method. To execute these methods, the die needs to be dipped in a liquid tank. That is, since the liquid tank to dip the die is needed to form the forming projections, the forming projections cannot easily be formed. Also, to increase the hardness of the forming projections on the hot press forming die shown in patent literature 1, the forming projections need to be formed by, for example, a plating method. To form the forming projections by the plating method such that these have a high hardness and such a height that efficiently makes the cooling medium flow, the time needed for plating becomes long, and the method cannot easily be executed.

Also, in the hot press forming die described in patent literature 1, the worker needs to manually repair each forming projection. For this reason, the work man-hours when repairing the forming projections increase, and a long work time is necessary, resulting an increase in the cost required for the repair. Furthermore, when repairing the forming projections, there is a risk that the ejection holes, the suction holes, and the like for the cooling medium are closed by a build-up welding material.

It is an object of the present invention to provide a hot press forming die for which forming projections with a high hardness can easily be formed.

Means of Solution to the Problem

In order to achieve the object, according to the present invention, there is provided a hot press forming die comprising a die main body made of alloy tool steel, and a number of forming projections projecting on the die main body and configured to form a forming surface that comes into contact with a heated metal plate material that is an object to be formed and form a refrigerant passage through which a cooling medium flows, wherein the die main body comprises a first forming portion in which the forming surface is formed to extend in a direction intersecting a forming direction of the metal plate material, a second forming portion in which the forming surface is formed to extend in the forming direction, and a third forming portion configured to connect the first forming portion and the second forming portion such that the forming surface becomes a convex surface, and the forming projection provided on the third forming portion is formed to be a projecting strip extending between the first forming portion and the second forming portion.

Effect of the Invention

According to the hot press forming die of the present invention, the forming projections can be formed by a 3D printer. It is therefore possible to provide a hot press forming die for which forming projections with a sufficient height and a hardness higher than the die main body can easily be formed.

BEST MODE FOR CARRYING OUT THE INVENTION

An embodiment of a hot press forming die according to the present invention will now be described in detail with reference to FIGS. 1 to 6.

(Explanation of Hot Press Forming Die)

Figure 1:
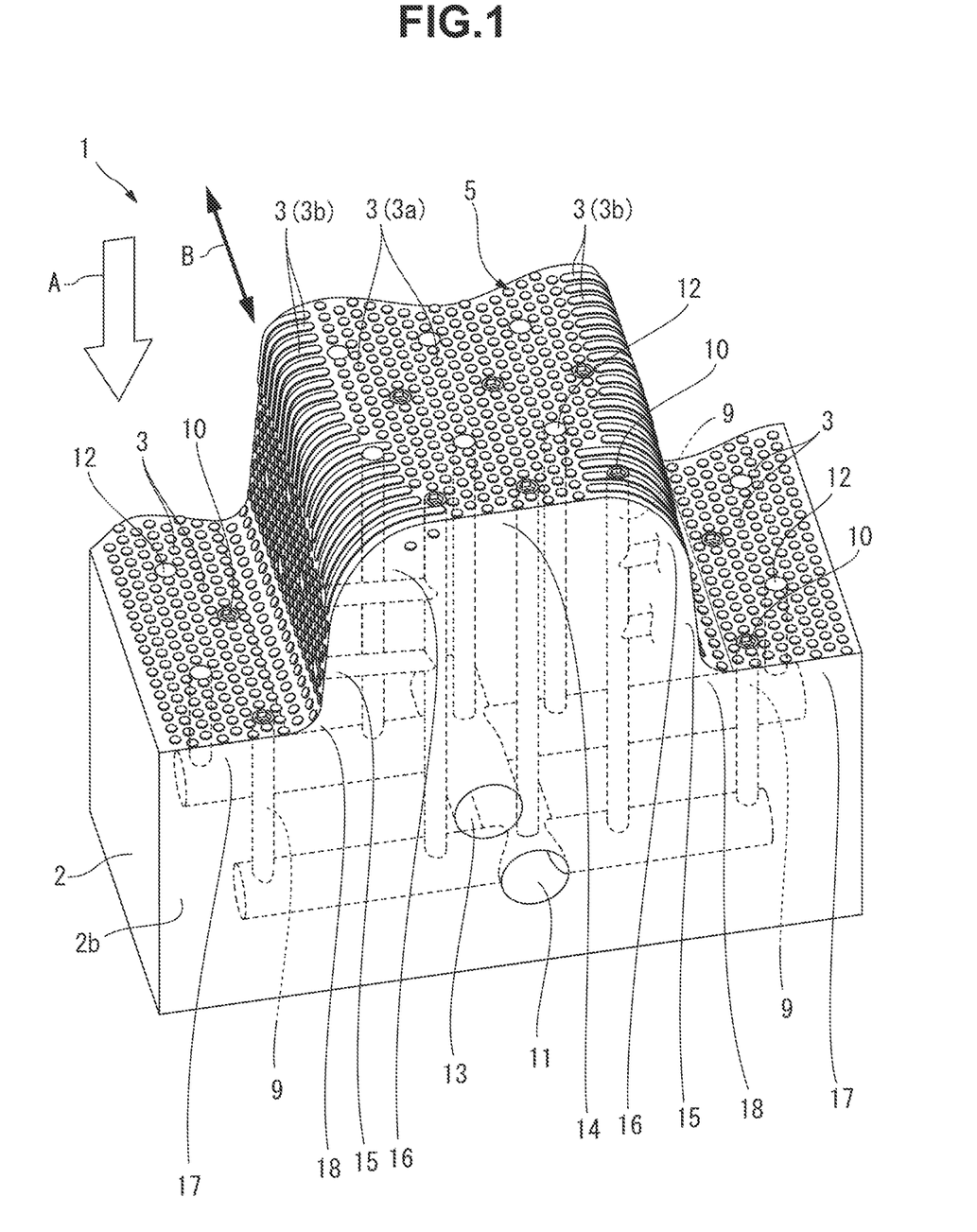
FIG. 1 is a perspective view of a part of a hot press forming die according to the present invention.
Figure 2:
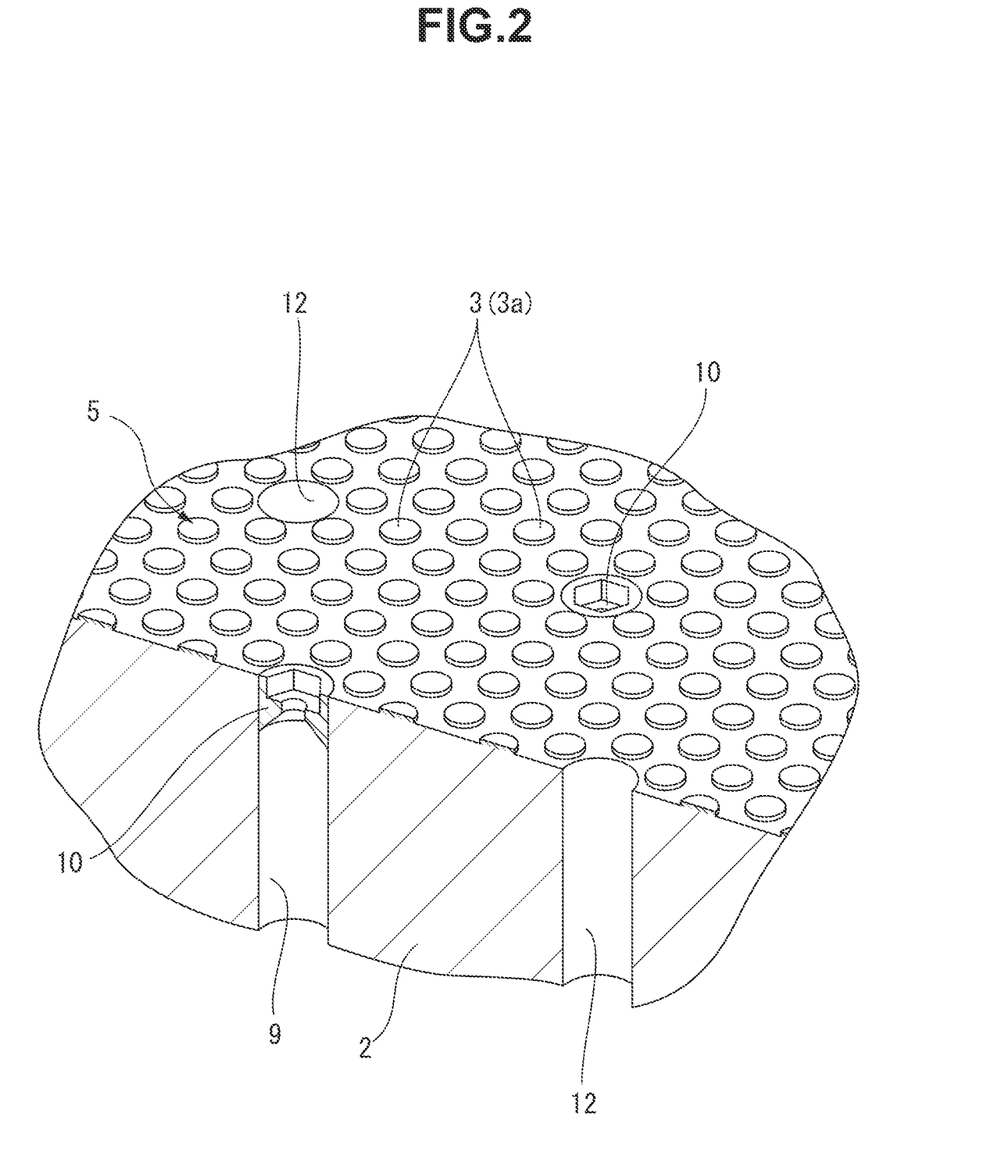
FIG. 2 is an enlarged perspective sectional view showing a main part.
Figure 3:
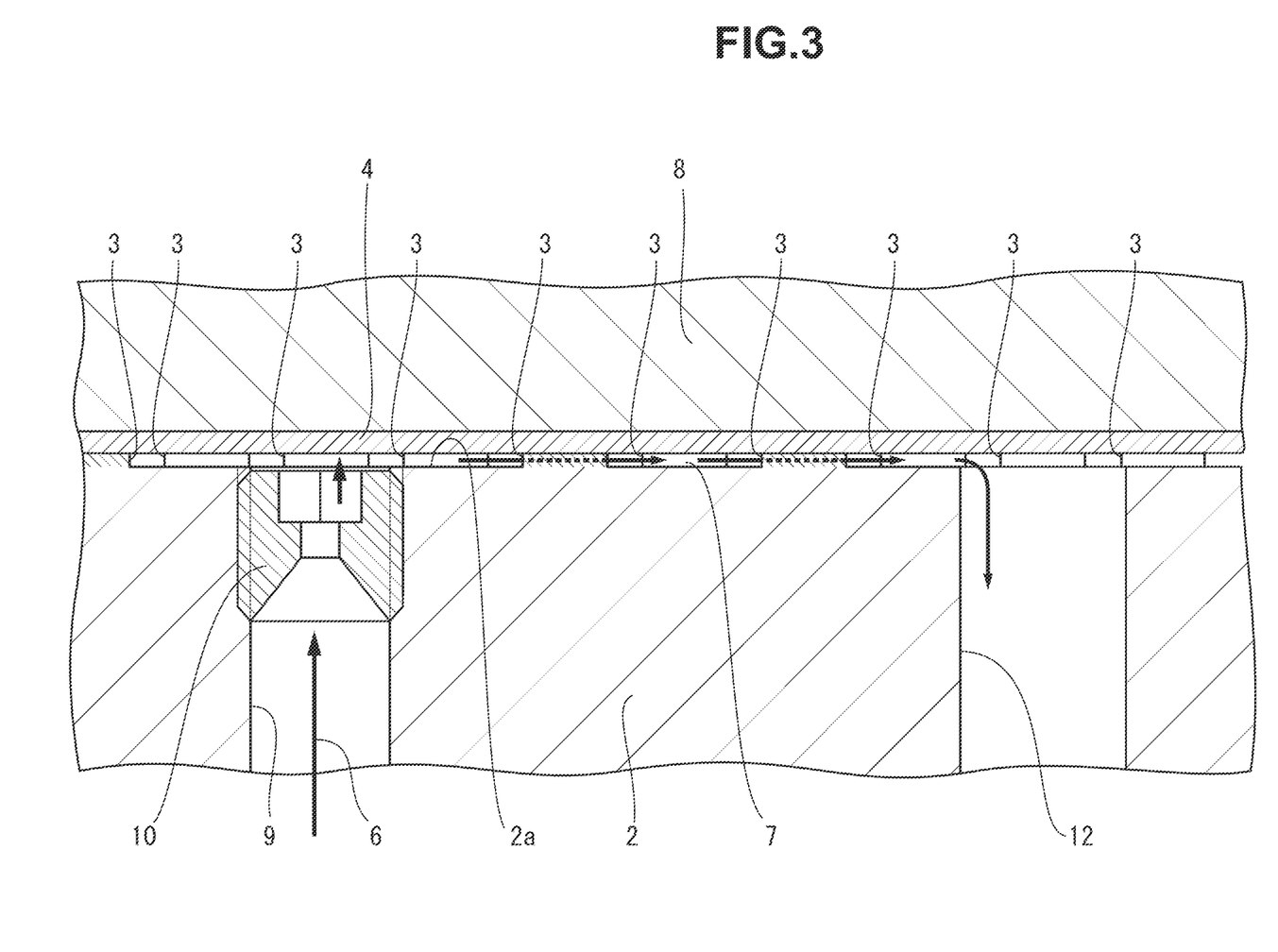
FIG. 3 is an enlarged sectional view showing the overlay portion of the die.

A hot press forming die according to the present invention is formed as shown in FIG. 1. A hot press forming die 1 shown in FIG. 1 includes a die main body 2, and a number of forming projections 3 projecting on the surface of the die main body 2. The forming projections 3 have two functions, as will be described later in detail. The first function is a function of forming a forming surface 5 (see FIGS. 1 and 2) that comes into contact with a heated metal plate material 4 (see FIG. 3) that is an object to be formed. The second function is a function of forming a refrigerant passage 7 through which a cooling medium 6 indicated by arrows in FIG. 3 flows, as shown in FIG. 3. The refrigerant passage 7 is formed by a gap surrounded by the metal plate material 4, a surface 2a of the die main body 2, and the projections 3 at the time of forming.

As shown in FIG. 3, the hot press forming die 1 sandwiches the heated metal plate material 4 with another die 8, as shown in FIG. 3, and forms it while quickly cooling.

Cooling of the metal plate material 4 is performed by ejecting the cooling medium 6 from ejection holes 9 opening to the surface 2a of the die main body 2 and directly applying the cooling medium to the metal plate material 4, as shown in FIG. 3. The outlet of each ejection hole 9 according to this embodiment is formed by a medium nozzle 10 to determine the direction of ejecting the cooling medium 6. The ejection holes 9 communicate with a supply passage 11 (see FIG. 1) formed in the die main body 2. The supply passage 11 is connected to a supply device (not shown). The cooling medium 6 is supplied from the supply device to the ejection holes 9 via the supply passage 11.

The cooling medium 6 applied to the metal plate material 4 passes through the refrigerant passage 7, spreads around the ejection holes 9, and is sucked into suction holes 12 opening to the surface 2a of the die main body 2. The suction holes 12 communicate with a discharge passage 13 formed in the die main body 2. The discharge passage 13 is connected to a suction device (not shown). The cooling medium 6 is discharged from the suction holes 12 to the outside of the die main body 2 via the discharge passage 13 and sucked by the suction device.

The die main body 2 is formed into a predetermined shape by machining or casting. As the material that forms the die main body 2, for example, alloy tool steel can be used. An example of the alloy tool steel is die steel, and SKD61 that is a kind of die steel can be used.

The die main body 2 shown in FIG. 1 forms the metal plate material 4 such that it obtains a so-called hat-shaped cross section, and includes first to fifth forming portions 14 to 18.

The first forming portion 14 is a portion located at the uppermost position in FIG. 1, and is a portion in which the forming surface 5 is formed to extend in a direction intersecting a forming direction A of the metal plate material 4. The forming direction A is a direction in which the other die 8 moves toward the hot press forming die 1 at the time of forming.

The second forming portions 15 are portions located on both sides of the first forming portion 14 in FIG. 1, and are portions in which the forming surface 5 is formed to extend in the forming direction A.

The third forming portions 16 are portions called shoulder portions of the die main body 2, and are portions that connect the first forming portion 14 and the second forming portions 15 such that the forming surface 5 becomes a convex surface. Note that although not illustrated, if a recessed portion is formed at the center of the first forming portion 14, a portion extending in the depth direction of the recessed portion is the second forming portion 15, and the opening portion of the recessed portion is the third forming portion 16.

The fourth forming portions 17 are portions in which the forming surface 5 is formed to extend in the direction intersecting the forming direction A of the metal plate material 4 at a position apart from the first forming portion 14 in the forming direction A.

The fifth forming portions 18 are portions that connect the second forming portions and the fourth forming portions such that the forming surface becomes a concave surface.

Figure 4:
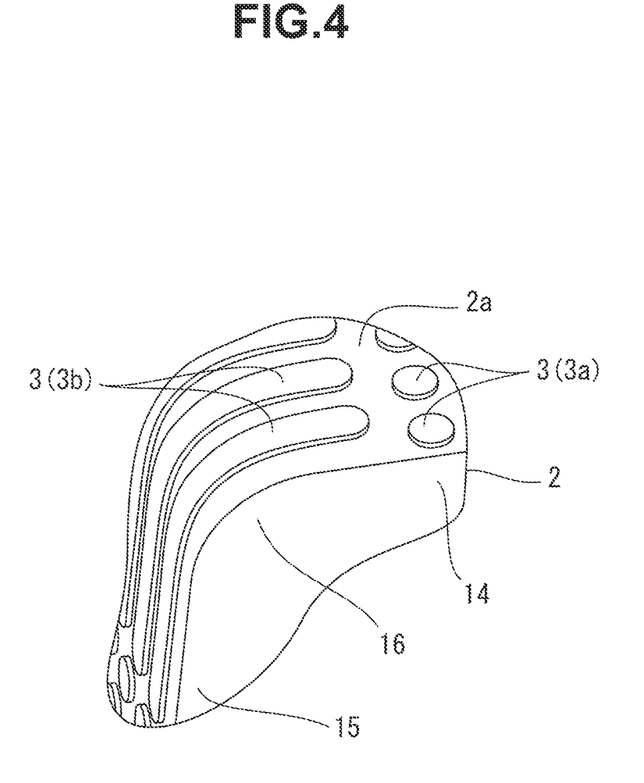
FIG. 4 is an enlarged perspective sectional view showing a part of a die main body.
Figure 5:
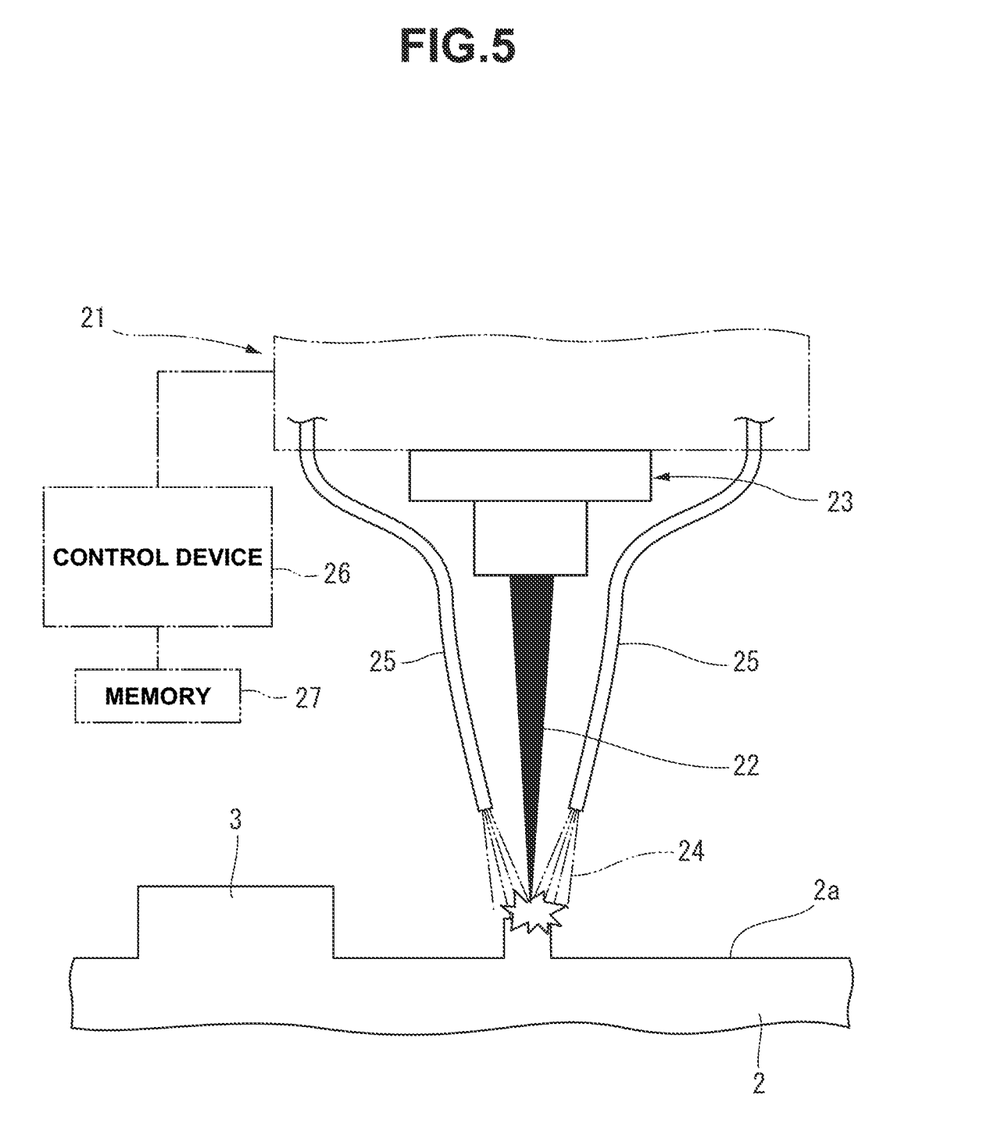
FIG. 5 is a schematic view of the head portion of a 3D printer.

The forming projections 3 are formed on the surface 2a of the die main body 2 by a 3D printer 21 (see FIG. 5). The forming projections 3 provided on portions except the third forming portions 16 of the die main body 2 are formed into a columnar shape, as shown in FIG. 2. The forming projections 3 provided on each third forming portion 16 of the die main body 2 are called oblong dimples, and are formed to be projecting strips extending between the first forming portion 14 and the second forming portion 15, as shown in FIG. 4. Hereinafter, to discriminate the forming projections 3 with the columnar shape and the forming projections 3 formed by projecting strips, the forming projections with the columnar shape will be denoted by reference numeral 3a, and the forming projections formed by projecting strips will be denoted by reference numeral 3b. In addition, when describing all forming projections without discrimination between the columnar shape and the projecting strips, these will simply be referred to as the forming projections 3.

In this embodiment, the forming projections 3b of the third forming portion 16 extend while bending to be located in the forming direction A gradually as these separate from the first forming portion 14 such that the forming surface 5 formed by the forming projections 3b becomes a convex surface. In addition, the forming projections 3b of the third forming portion 16 are provided to be arranged at a predetermined interval in a direction B (see FIG. 1) in which the boundary between the first forming portion 14 and the second forming portion 15 extends, in other words, the direction orthogonal to the forming direction A or the direction along the second forming portion 15 (the direction from the lower right side to the upper left side in FIG. 1). The cross-sectional shape of the forming projections 3b formed by projecting strips viewed from the longitudinal direction is a rectangular shape, like the forming projections 3a with the columnar shape. The width of the forming projections 3b formed by projecting strips provided on the third forming portion 16, that is, the width in the direction B in which the boundary between the first forming portion 14 and the second forming portion 15 extends is preferably the same as the width of the forming projections 3a formed on the first forming portion 14 or the second forming portion 15. The width is preferably 3 mm to 8 mm, and most preferably 8 mm.

A part of the third forming portion 16 according to this embodiment is formed such that the radius of curvature of the convex surface changes in the direction B in which the boundary between the first forming portion 14 and the second forming portion 15 extends. The third forming portion 16 shown in FIG. 1 is formed such that the radius of curvature of the convex surface gradually becomes small from one end face 2b of the die main body 2 in the direction B to the other end face in the direction B, and after reaching a predetermined radius of curvature, the radius of curvature becomes constant. The length of the forming projection 3b formed by a projecting strip in the longitudinal direction is longer as the radius of curvature of the convex surface is larger. Note that although not illustrated, the third forming portion 16 can also be formed such that the radius of curvature of the convex surface gradually changes from one end of the die main body 2 to the other end in the direction B, or the radius of curvature of the convex surface becomes constant from one end of the die main body 2 to the other end in the direction B.

The 3D printer 21 forms the forming projections 3 by laser build-up welding. The 3D printer 21 includes a combined working machine.

As shown in FIG. 5, the 3D printer 21 according to this embodiment includes a laser head 23 that emits a laser beam 22, and supply nozzles 25 that eject metal powder 24. In the 3D printer 21, the surface 2a of the die main body 2 is heated by the laser beam 22, and simultaneously, the metal powder 24 is supplied from the supply nozzles 25 to the surface 2a, and the melted metal powder 24 is stacked on the surface 2a, thereby forming the forming projections 3. The operation of the 3D printer 21 is controlled by a control device 26. The control device 26 includes a memory 27 in which the data of the output of the laser beam 22, the supply amount of the metal powder 24, and the moving direction and moving amount of the laser head 23 are recorded.

The material of the metal powder 24 supplied from the supply nozzles 25, that is, the material used to form the forming projections 3 is a steel-based material having a hardness higher than that of the alloy tool steel used to form the die main body 2. Examples of the steel-based material of this type are maraging steel and cobalt-based Stellite™.

Figure 6:
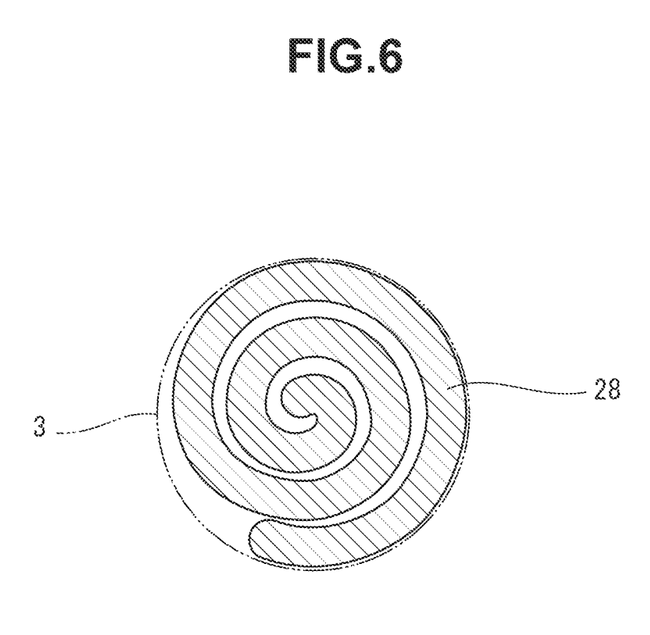
FIG. 6 is a schematic view for explaining a method of forming a forming projection.

To form the forming projection 3 by the 3D printer 21, as shown in FIG. 6, the laser head 23 is moved along a spiral-shaped moving path 28. When moving the laser head 23 in a spiral pattern, the laser head 23 is moved from the center of the forming projection 3 to the outer periphery side, or the laser head 23 is moved from the outer periphery side of the forming projection 3 to the center. When forming many forming projections 3 by the 3D printer 21, machining may be performed for the forming projections 3 formed by the 3D printer 21 to equalize the outer diameters or heights of the forming projections 3. The machining is performed by cutting or grinding using, for example, a rotating tool.

Explanation of Effects by this Embodiment

The forming projections 3 of the hot press forming die 1 configured as described above are formed by the 3D printer 21 using a material with a hardness higher than that of the die main body 2. Hence, according to this embodiment, it is possible to provide a hot press forming die for which the forming projections 3 with a high hardness can easily be formed, and a method of manufacturing the hot press forming die.

The forming projections 3b provided on the third forming portion 16 of the die main body 2 are formed to be projecting strips extending between the first forming portion 14 and the second forming portion 15. For this reason, since the pressure resistance of the bending portion of the die main body 2 improves, the forming property can be maintained even if forming is performed under a high pressure. Also, the area of the surfaces of the forming projections 3b formed by projecting strips and serving as the forming surface 5 is larger than the area of the surfaces of the forming projections 3a having a columnar shape and serving as the forming surface 5. Hence, since the frictional resistance generated when the metal plate material 4 comes into contact with the forming projections 3a and 3b at the time of forming can be increased, the metal plate material 4 can be prevented from slipping on the die main body 2. In addition, when the surface area is increased, the upper die can be prevented from being caught in the middle of forming, and the trace of dimples can be prevented from remaining on the forming surface. Also, since the flow of cooling water improves, the effect of raising the cooling efficiency can be expected.

The 3D printer 21 according to this embodiment forms the forming projection 3 by laser build-up welding in which the surface 2a of the die main body 2 is heated by the laser beam 22, and the metal powder 24 is supplied to the surface 2a. Hence, when the 3D printer 21 is used, the fine forming projections 3 can be formed at a high accuracy.

(Modifications of Forming Projections)

Figure 7:
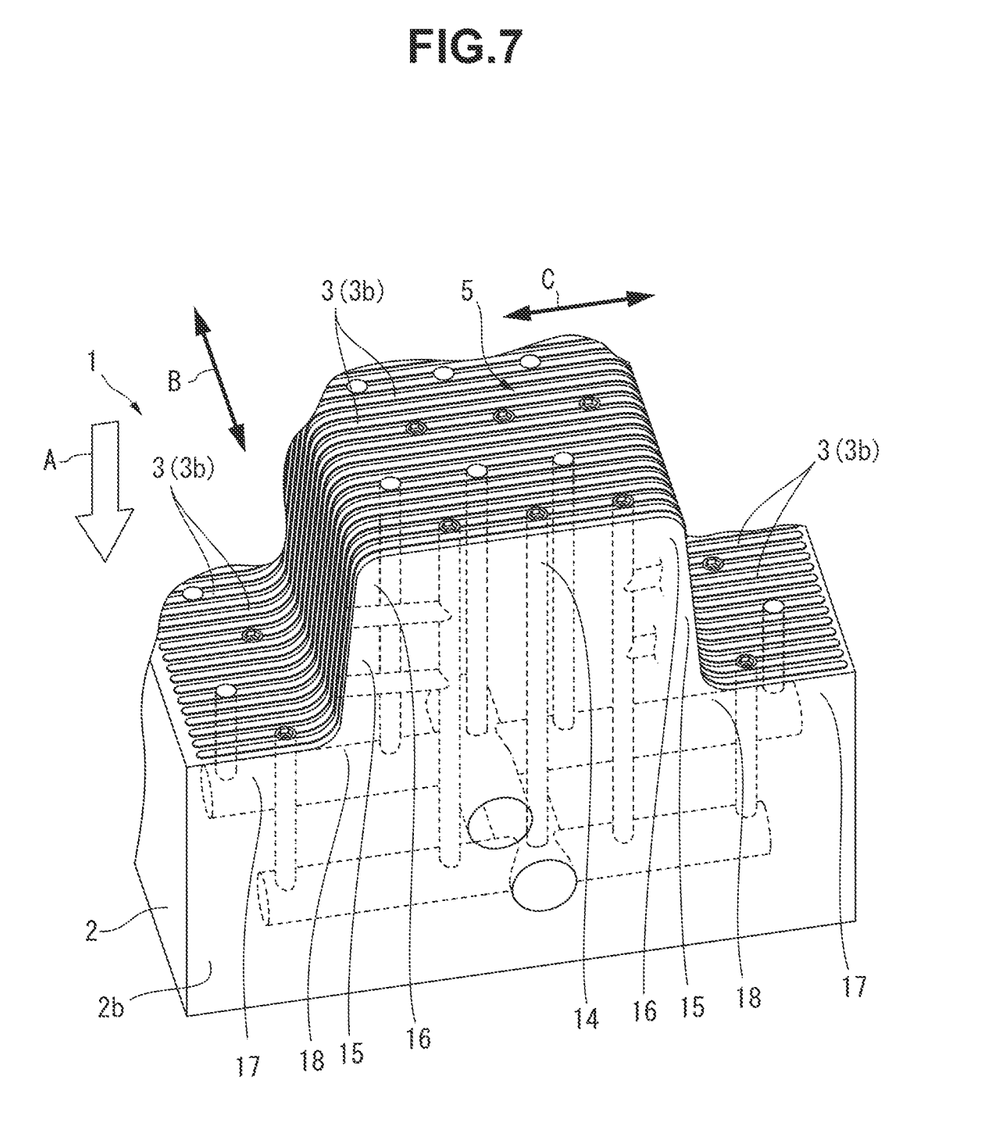
FIG. 7 is a perspective view of a part of a hot press forming die showing a modification of forming projections.
Figure 8:
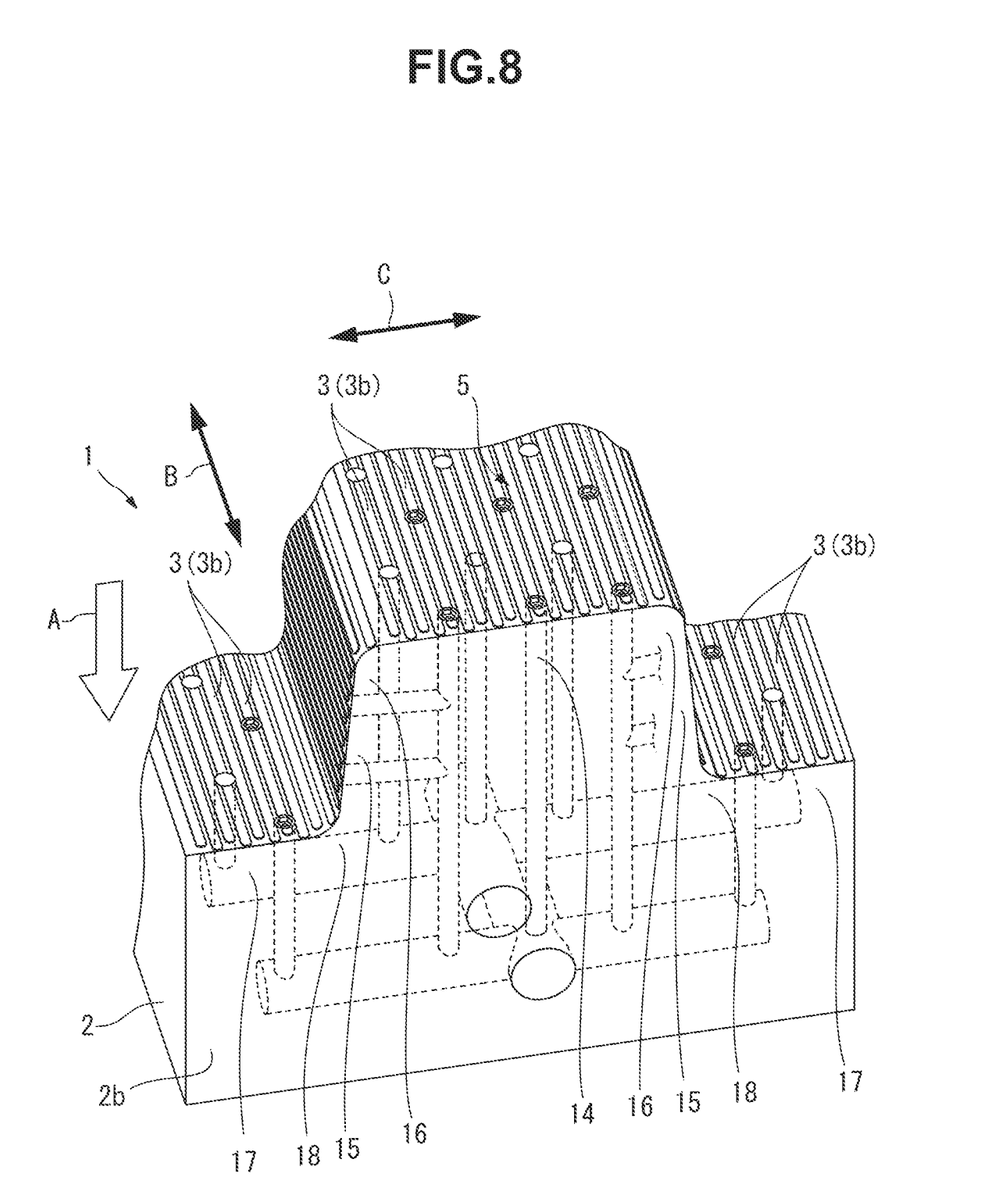
FIG. 8 is a perspective view of a part of a hot press forming die showing a modification of forming projections.

The forming projections 3b formed by projecting strips can be formed as shown in FIGS. 7 and 8 depending on the shape of the formed product.

The forming projections 3b shown in FIG. 7 are formed to be parallel to a direction C that is a direction orthogonal to the forming direction A and also orthogonal to the direction B in which the boundary between the first forming portion 14 and the second forming portion 15 extends. The forming projections 3b extend from one side portion of the die main body 2 to the other side portion. Also, the forming projections 3b shown in FIG. 7 are formed to be arranged at a predetermined interval in the direction B in which the boundary between the first forming portion 14 and the second forming portion 15 extends, and are provided on the whole region from one end face 2b of the die main body 2 in the direction B to the other end face in the direction B.

The forming projections 3b shown in FIG. 8 are formed to be parallel to the direction B in which the boundary between the first forming portion 14 and the second forming portion 15 extends, and are formed to be arranged at a predetermined interval in the direction C that is a direction orthogonal to the forming direction A and also orthogonal to the direction B in which the boundary between the first forming portion 14 and the second forming portion 15 extends. The forming projections 3b shown in FIG. 8 are provided on the whole region from one end face 2b of the die main body 2 in the direction B to the other end face in the direction B.

Even if the forming projections 3b formed by projecting strips are formed as shown in FIG. 7 or 8, when the surface area of the forming projections 3b is increased, the upper die and the formed product can be prevented from being caught in the middle of forming, and the trace of dimples can be prevented from remaining on the forming surface. Also, since channels can be formed on the forming surface, the flow of cooling water improves, and therefore, the effect of raising the cooling efficiency can be expected.

EXPLANATION OF THE REFERENCE NUMERALS AND SIGNS

1 . . . hot press forming die, 2 . . . die main body, 2a . . . surface, 3, 3a, 3b . . . forming projection, 4 . .

. metal plate material, 5 . . . forming surface, 6 . . . cooling medium, 7 . . . refrigerant passage

The invention claimed is:

1. A hot press forming die comprising:

a die main body including a surface and made of alloy tool steel; and a plurality of forming projections projecting from the surface of the die main body and configured to form a forming surface that comes into contact with a heated metal plate material that is an object to be formed, wherein the plurality of forming projections and the surface of the die main body form a refrigerant passage through which a cooling medium flows, wherein the die main body comprises:

a first forming portion in which the forming surface is formed to extend in a direction intersecting a forming direction of the metal plate material;

a second forming portion in which the forming surface is formed to extend in the forming direction; and a third forming portion configured to connect the first forming portion and the second forming portion such that the forming surface becomes a convex surface, and wherein each of the plurality of forming projections, projecting from a surface of the third forming portion is formed to be a projecting strip extending between the first forming portion and the second forming portion.

2. The hot press forming die according to claim 1, wherein each of the plurality of forming projections is made of a steel-based material having a hardness higher than that of the alloy tool steel.

3. The hot press forming die according to claim 1, wherein at least a part of the third forming portion is formed such that a radius of curvature of the convex surface changes in a direction in which a boundary between the first forming portion and the second forming portion extends, and a length of the projecting strip in a longitudinal direction is longer as the radius of curvature is larger.

4. The hot press forming die according to claim 2, wherein at least a part of the third forming portion is formed such that a radius of curvature of the convex surface changes in a direction in which a boundary between the first forming portion and the second forming portion extends, and a length of the projecting strip in a longitudinal direction is longer as the radius of curvature is larger.

\* \* \* \* \*